Figures 1, 2:
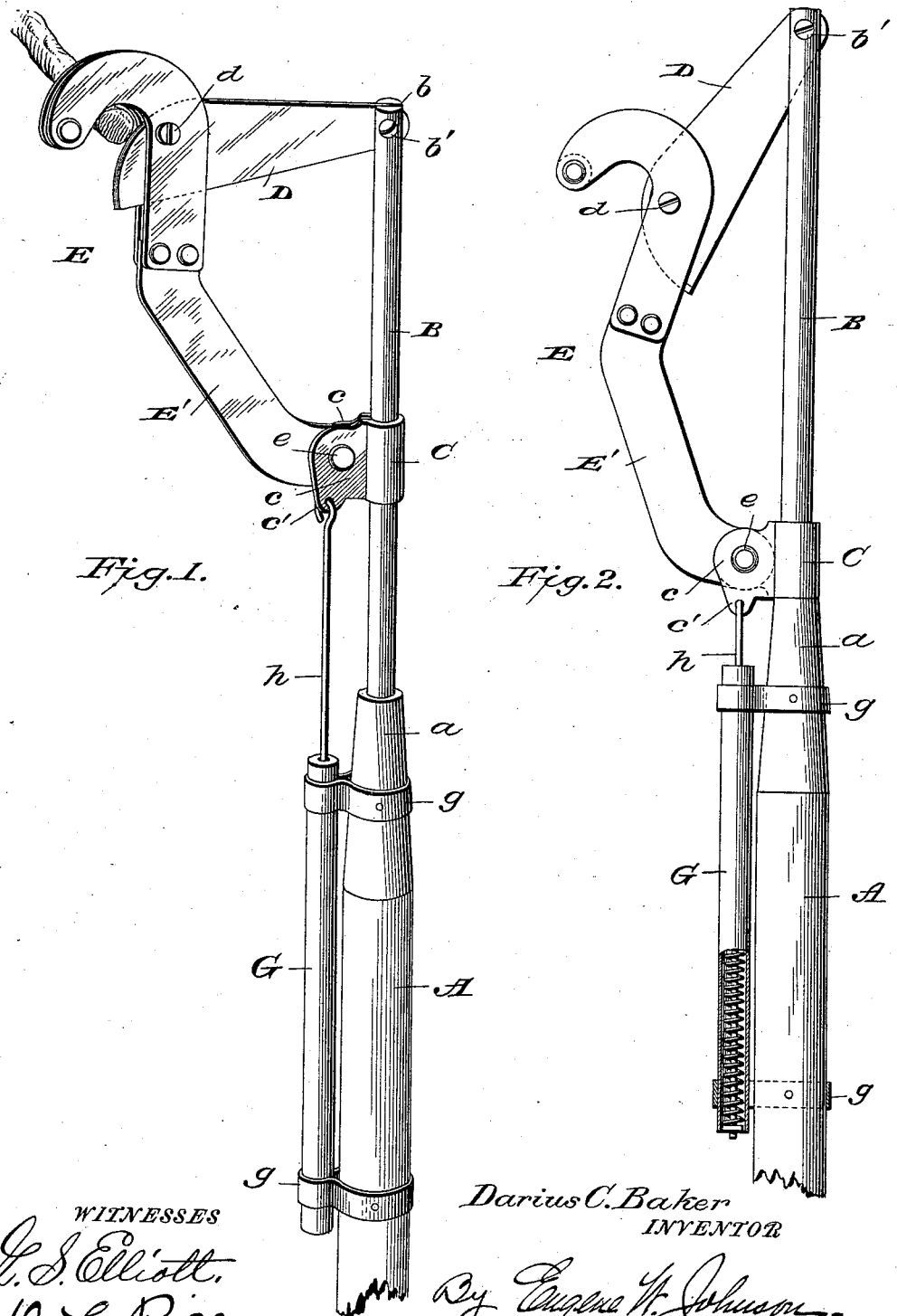

(No Model.)

D. C. BAKER.
PRUNING IMPLEMENT.

No. 588,943. Patented Aug. 31, 1897.

WITNESSES
L. S. Elliott.
D. L. Rice

Darius C. Baker
INVENTOR
By Eugene W. Johnson
Attorney

THE NORRIS PETERS CO., PHOTO-LITHO., WASHINGTON, D. C.

UNITED STATES PATENT OFFICE.

DARIUS C. BAKER, OF SAUGATUCK, MICHIGAN, ASSIGNOR OF THREE-FOURTHS TO JOHN PRIEST, CHARLES E. BIRD, AND CARY HANCHETT, OF SAME PLACE.

PRUNING IMPLEMENT.

SPECIFICATION forming part of Letters Patent No. 588,943, dated August 31, 1897.

Application filed February 4, 1897. Serial No. 621,991. (No model.)

*To all whom it may concern:*

Be it known that I, DARIUS C. BAKER, a citizen of the United States of America, residing at Saugatuck, in the county of Allegan and State of Michigan, have invented certain new and useful Improvements in Pruning Implements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in pruning implements; and it consists in the particular construction and organization of the parts embodying a staff or handle to which is secured a cylindrical rod the upper end of which is bifurcated and has pivoted thereto a knife with a curved cutting edge, the rod also carrying a slide with outwardly-projecting lugs, between which is pivoted the lower end of a hook, the knife being pivoted to the hook, together with an incased spring carried by the handle and a rod which is actuated by the spring and connected to the slide, as will be hereinafter set forth and specifically claimed.

The object of my invention is to provide a pruning implement which in operation will give a shearing cut to the limb of a tree or to shrubbery, which may be used with the end of the handle either raised or lowered, and one in which the parts are so constructed that the finest material may be used and the implement furnished at a low price.

In the accompanying drawings, Figure 1 is a perspective view of a pruning implement constructed in accordance with my invention; and Fig. 2 is a side elevation, partly in section.

A designates the handle or staff, which is provided at its upper end with a ferrule $a$ and with a cylindrical rod B, which is attached to the handle in any suitable manner. The upper end of the rod B, is slitted or bifurcated, as shown at $b$, and said portion is apertured, one of the apertures being screw-threaded to receive a pivot or screw $b'$.

The rod B carries a slide C, which is struck up from a single piece of sheet metal, the sleeve thereof encircling the rod. Said slide has outwardly-projecting ears $c\ c$, which lie parallel with each other, one or both of said ears having an apertured lug $c'$, the hole therein being on a line with the rivet which connects the ears and hook. The knife or blade D has a curved or segmental cutting edge, preferably beveled on one side, and said knife tapers from the cutting edge to the end which is secured by the screw $b'$ to the rod. The blade near its outer end has an aperture through which passes a screw $d$. It will be noted that the position of the aperture in the blade is such that the major portion of the metal is below the aperture through which the screw $d$ passes, so that the blade will be better able to resist the strain that is brought thereon in use.

E refers to the hook, which is made up of three parts, which are riveted together, the upper parts providing a hook between which the outer end of the blade D operates, the rivets in the lower end of the hook connecting thereto a flat bar or plate, the ends thereof projecting at an angle with the central portion. Upon the rivet which connects the outer ends of the hooks is placed a washer to hold the plates apart, and they are also held apart at their lower ends by the upper end of the bar or plate E'. The lower bent end of the plate E' is pivotally attached to the ears $c\ c$ of the slide by a rivet $e$. The hook, blade, and slide can be made from sheet-steel, and said blade can readily be removed from the rod and hook, when it is desired to sharpen the same, by simply removing the screws.

To the handle or staff A is secured by means of bands $g\ g$ a tube G which incases a helical spring, the upper end of said spring bearing upon the inturned upper end of the tube. Through the coils of the spring passes a rod $h$, the upper end being formed into an eye for engagement with the lug $c'$, and the lower end of said rod is provided with a suitable nut.

The tendency of the spring is to draw the slide toward the ferrule, which is a very desirable feature in pruning with the knife downwardly inclined, as in cutting bushes.

From the foregoing it will be understood that the implement can be operated with one hand, the slide bearing normally against the ferrule, and that the edge of the blade lies between the plates of the hook, also that when the blade is moved in an opposite direction to its fullest extent the lower edge will abut against the upper inner corner of the plate E'.

By providing a hook made up of two plates, with a space between, and pivoting the knife therein the blade is braced. The opposite end of the knife being secured in the bifurcated end of the rod assists in holding the parts in proper alinement without strain upon the pivots or screws.

I do not claim, broadly, a pruning implement with a hook and cutting-blade carried by a handle or means to effect a movement of the knife from the hook.

What I claim as new, and desire to secure by Letters Patent, is—

1. A pruning implement consisting of a handle and a rod, a blade pivoted to the upper end of the rod, a slide which embraces the rod and is provided with projecting ears, a hook-section made up of a pair of similarly-shaped end plates between which the blade is pivoted and a flat member or plate E', the ends of which project at an angle with its central portion, the lower portion of the hook-sections overlying the upper end of the plate E' and being rigidly secured thereto by rivets, the lower end of said member being positioned between the ears of the slide and pivotally secured thereto, substantially as shown and for the purpose set forth.

2. In a pruning implement, the combination with the handle and rod, a blade pivoted to the upper end of the rod, a hook held in sliding engagement therewith, and pivotally connected to the blade, a slide mounted on the rod, and provided with projecting ears between which the lower end of the hook is pivoted, and a depending lug; together with a tube, the upper end of which is partially closed, bands for connecting the tube to the handle so that it will be parallel therewith, a helical spring positioned within the tube, and a rod engaging with the spring, and the end of the slide, substantially as shown and for the purpose set forth.

In testimony whereof I affix my signature in presence of two witnesses.

DARIUS C. BAKER.

Witnesses:
JAMES McMAN,
WILLIAM RODA.